(12) United States Patent
Hasegawa

(10) Patent No.: US 7,281,805 B2
(45) Date of Patent: Oct. 16, 2007

(54) PROJECTION-TYPE DISPLAY APPARATUS

(75) Inventor: Masahide Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/886,116

(22) Filed: Jul. 6, 2004

(65) Prior Publication Data
US 2005/0018148 A1    Jan. 27, 2005

(30) Foreign Application Priority Data
Jul. 22, 2003   (JP)   ............................. 2003-277916

(51) Int. Cl.
*G03B 21/28*   (2006.01)
*G03B 21/56*   (2006.01)

(52) U.S. Cl. .......................... 353/77; 353/98; 348/794; 359/460

(58) Field of Classification Search ................. 353/74, 353/77, 78, 79, 80, 81, 98, 119; 359/443, 359/449, 453, 454, 456, 457, 459, 460; 348/787–789, 348/794
See application file for complete search history.

(56) References Cited

U.S. PATENT DOCUMENTS

| | | | |
|---|---|---|---|
| 4,674,836 A | | 6/1987 | Yata |
| 4,729,631 A | * | 3/1988 | Takahashi et al. .......... 359/456 |
| 4,963,016 A | * | 10/1990 | Heijnemans et al. .......... 353/74 |
| 5,208,620 A | * | 5/1993 | Mitsutake et al. ............ 353/74 |
| 5,504,544 A | * | 4/1996 | Dreyer et al. ................ 353/38 |
| 6,059,412 A | | 5/2000 | Sugita |
| 6,304,379 B1 | * | 10/2001 | Kobayashi ................... 359/457 |
| 6,616,283 B1 | | 9/2003 | Takano |
| 6,755,534 B2 | * | 6/2004 | Veligdan et al. ............... 353/38 |
| 6,805,447 B2 | * | 10/2004 | Takeuchi ...................... 353/71 |
| 6,899,433 B2 | * | 5/2005 | Veligdan ....................... 353/37 |
| 2002/0008853 A1 | | 1/2002 | Sunaga |
| 2004/0032659 A1 | * | 2/2004 | Drinkwater .................. 359/558 |
| 2004/0196562 A1 | * | 10/2004 | Watanabe et al. ........... 359/626 |

FOREIGN PATENT DOCUMENTS

| | | |
|---|---|---|
| JP | 11-146307 | 5/1999 |
| JP | 11-163543 | 6/1999 |
| JP | 2001-255462 | 9/2001 |

* cited by examiner

*Primary Examiner*—Andrew T Sever
(74) *Attorney, Agent, or Firm*—Canon USA, Inc., IP Division

(57) ABSTRACT

A thin-shaped projection-type display apparatus capable of displaying a high-quality image without causing any ghost image is provided. The projection-type display apparatus includes a screen having a prism, and a projection optical system for guiding image light to the screen. The projection optical system includes a plurality of optical elements. An optical element disposed nearest to the screen on an optical path of the image light among the plurality of optical elements is a mirror. An angle made by the normal to a surface of the mirror approximately at the center of the mirror and the normal to a surface of the screen is between 75 degrees and 87.5 degrees inclusive.

9 Claims, 9 Drawing Sheets

PROJECTION-TYPE DISPLAY APPARATUS

CROSS REFERENCE TO RELATED APPLICATIONS

This application claims the benefit of Japanese Application 2003-277916, filed Jul. 22, 2003, the entire contents of which are incorporated by reference herein.

BACKGROUND OF THE INVENTION

1. Field of the Invention

The present invention relates to a projection-type display apparatus, and more particularly to a technique for realizing a reduction in thickness of a rear-projection-type video apparatus for projecting, in a magnified fashion, a video image, computer-based video picture or the like from behind a screen.

2. Description of Related Art

In recent years, a great variety of video sources having high image quality are becoming widespread, for example, owing to launching of digital television broadcasting service. Also, presentations using a computer-based video picture are becoming commonplace at meetings and conferences. Then, video apparatuses for use for such purposes are increasingly required to have a large-sized screen having high image quality. As a promising technique for realizing such a large-sized screen having high image quality at low cost, there is a rear-projection-type video apparatus. In the rear-projection-type video apparatus, as is well known, illumination light is emitted on a high-intensity CRT (cathode ray tube), a transmission liquid crystal display, a reflection liquid crystal display, a digital micromirror device (DMD) or the like, and image light obtained at the image plane thereof is magnified and projected by a projection optical system. The image light is then projected onto the back side of a screen, so that a viewer can view a video image on the front side of the screen. Therefore, in order to greatly magnify the image light, it is necessary to increase an optical path length thereof correspondingly. The increased optical path length of the image light disadvantageously causes an increase in depth of the apparatus.

In view of this, it is conceivable to project image light obliquely onto a screen so as to decrease the depth of the apparatus, and a variety of proposals based on such conception have been made. For example, U.S. Patent Application Publication No. 2002/0008853 A1 discloses such a projection optical system having much improved performance and indicates that a high-performance video apparatus can be realized by using an oblique projection method.

On the other hand, there is a problem associated with a rear projection screen for use in the oblique projection method as follows. In cases where an ordinary refraction-type Fresnel lens is used in the rear projection screen, the surface reflectance of an entrance surface of the screen is very large due to an increased angle of incidence. Therefore, sufficient brightness cannot be obtained on the screen. In addition, since reflectance rapidly increases as an angle of incidence becomes larger, uniform brightness cannot be obtained. To overcome such problems, there is a proposal for the usage of a total-reflection-prism-type Fresnel lens as disclosed in, for example, U.S. Pat. No. 4,674,836. In the total-reflection-prism-type Fresnel lens, a number of prisms are arranged along arc lines and total internal reflection occurs within each prism, so that sufficient brightness can be obtained even if an angle of incidence is large.

Folding an optical path by using a plane mirror is effective for reducing the depth and height of the apparatus in the oblique projection method. For that purpose, there have been made a number of proposals. For example, the above-mentioned U.S. Patent Application Publication No. 2002/0008853 A1 discloses using a mirror that is approximately parallel to a screen. Also, the above-mentioned U.S. Pat. No. 4,674,836 discloses using a mirror that is approximately perpendicular to a screen.

Using both the projection optical system and the total-reflection-prism-type Fresnel lens disclosed in the above proposals may make it possible to realize a rear-projection-type video apparatus having a reduced depth capable of obtaining uniform brightness. However, there are some problems in practice. For example, in the total-reflection-prism-type Fresnel lens, if an angle of incidence is relatively small, some incident rays may pass thorough the Fresnel lens without impinging on a total-reflection surface, as shown in FIG. 11. Therefore, it is necessary to make an apex angle $\theta t$ of each prism sufficiently small.

In FIG. 11, a ray "b" which falls on a screen 102 at an angle $\alpha$ relative to the normal 121 to the screen 102 is incident on an entrance surface 181 of a prism PR101 at an incident angle $\theta i$. The ray "b" is refracted at the entrance surface 181 according to Snell's law of refraction and becomes a refracted ray "b'". The refracted ray "b'" emerges from the entrance surface 181 at an exit angle $\theta r$ and is incident on a total-reflection surface 182 of the prism PR101 at an angle larger than a critical angle. Then, the ray "b'" is reflected and bent 100% by the total-reflection surface 182 and becomes a ray "c" that is approximately perpendicular to the screen 102. The apex angle $\theta t$ of the prism PR101 and an angle $\theta s$ of the entrance surface 181 relative to the surface of the screen 102 are so predetermined as to ensure these actions of the total-reflection-prism-type Fresnel lens. However, a ray "b2" nearer the tip of an adjoining prism PR102 than the incident ray "b" advances straight as a ray "b2'" without impinging on the total-reflection surface 182. The straight advancing ray "b2'" not only results in loss in quantity of light but also becomes the cause of a phenomenon in which an image appears in a position different from an original position, what is called a ghost image, thereby remarkably deteriorating video image quality.

Reducing the apex angle $\theta t$ may contribute to preventing such a phenomenon, but causes another problem. FIG. 12 illustrates a case where an apex angle $\theta t$ of each prism is reduced with respect to the same incident angle $\alpha$ as in FIG. 11. In FIG. 12, the same or similar parts as in FIG. 11 are denoted by like reference characters. An incident ray "b" is bent likewise and becomes a ray "c" that is approximately perpendicular to the screen 102. Because of the apex angle $\theta t$ being reduced, a ray "b2" passing near the tip of the adjoining prism PR102 is also incident on the total-reflection surface 182. The ray "b2" is, therefore, bent in a correct direction and becomes a ray "c2" that is approximately perpendicular to the screen 102. However, a reflected ray from the entrance surface 181 of the prism PR101 may be incident on a total-reflection surface 183 of the adjoining prism PR102 from the back side thereof, thereby becoming astray light to cause a ghost image. More particularly, reflection necessarily occurs at the boundary between media. For example, when a ray passes from air to an acrylic resin having a refractive index of 1.49, about 4% of the ray is reflected. Referring to FIG. 12, reflected light of the incident ray "b" is a ray "d", which will not return again to the surface of the screen 102. On the other hand, a reflected ray "d2" of the incident ray "b2" enters the adjoining prism PR102 and then advances as a ray "s", a ray "t" and a ray "u" in that order, thereby resulting in a ghost image appearing on the screen 102. The ray "u", which has passed through three boundary surfaces following the reflected ray "d2", attenuates only to about 88% even if 4% is lost by reflection at every boundary surface. Accordingly, the ray "u" still has a quantity of light equivalent to 3.5% (=4%×88%) of the incident ray "b2" and, therefore, deteriorates video image quality.

In cases where a mirror that is approximately parallel to a screen is employed as a plane mirror for folding an optical path so as to reduce the depth of the apparatus, the size in the depth direction becomes about half, but the size in the height direction becomes much larger than the height of the screen. In particular, if the minimum value of an incident angle is made larger for the purpose of overcoming the above-mentioned problem arising when the incident angle is small, the height of the apparatus inevitably becomes very large. Therefore, in the case of a screen using the total-reflection-prism-type Fresnel lens, it is preferable to use a plane mirror that is approximately perpendicular to the screen. If an angle between the plane mirror and the screen is made slightly smaller than a right angle, the depth of the apparatus can be made minimum. However, in this instance, another problem arises in that, among reflected rays from the prism surface of the screen, a ray which has not enter the adjoining prism reflects from the plane mirror and then returns again to the screen, thereby causing a ghost image.

Such a phenomenon is described with reference to FIG. 13. FIG. 13 is a schematic sectional side view showing optical paths inside a rear-projection-type video apparatus 101. Among rays projected from a light source unit 104 by a projection optical system 141, a ray "a" corresponding to the center of an image plane is reflected from a plane mirror 103 and becomes a ray "b". The ray "b" is incident on a total-reflection Fresnel screen 102 and is then bent as a ray "c". The ray "c" emerges from the total-reflection Fresnel screen 102. Here, a certain fraction of reflected light from an entrance surface of the Fresnel screen 102 (i.e., the entrance surface 181 of the prism PR101) enters an adjoining prism again, thereby becoming a ghost image, as mentioned above. The remainder, which has not entered the adjoining prism again, advances as a ray "d". The ray "d" is reflected from the plane mirror 103 and becomes a ray "e". The ray "e" is disadvantageously incident on a position different from the original position on the screen 102. The ray "e" is then bent as a ray "f" by the total-reflection Fresnel action. The ray "f" emerges from the screen 102, which will be viewed as a ghost image. Likewise, a ray "g" that proceeds to the bottom side of the screen 102 advances as a ray "h", a ray "j", a ray "k" in that order and becomes a ray "l", which will be also viewed as a ghost image. Furthermore, the total-reflection Fresnel screen 102 functions as a kind of Fresnel concave mirror when reflecting the ray "b" in the direction of the ray "d" and, therefore, has a light collecting function. Accordingly, a ghost image having very high brightness will be viewed.

SUMMARY OF THE INVENTION

An object of the present invention is to provide a thin-shaped projection-type display apparatus capable of displaying a high-quality image without producing any ghost image.

To attain the above object, in accordance with one aspect of the present invention, there is provided a projection-type display apparatus, comprising a screen having a prism, and a projection optical system for guiding image light to the screen, the projection optical system including a plurality of optical elements, wherein an optical element disposed nearest to the screen on an optical path of the image light among the plurality of optical elements is a mirror, and wherein an angle made by a normal to a surface of the mirror approximately at the center of the mirror and a normal to a surface of the screen is between 75 degrees and 87.5 degrees inclusive.

In accordance with another aspect of the present invention, there is provided a projection-type display apparatus, comprising a projection optical system for guiding image light to a screen, the projection optical system including a plurality of optical elements, wherein an optical element disposed nearest to the screen on an optical path of the image light among the plurality of optical elements is a mirror, wherein an angle α made by an optical path of the image light falling on the screen after passing through the center of a pupil of the projection optical system and a normal to a surface of the screen is between 60 degrees and 85 degrees inclusive, and wherein an angle made by a normal to a surface of the mirror approximately at the center of the mirror and the normal to the surface of the screen is between (45+(a minimum value of the angle α)/2) degrees and (45+(a maximum value of the angle a)/2) degrees inclusive.

In accordance with a further aspect of the present invention, there is provided a projection-type display apparatus, comprising a total-reflection-prism-type Fresnel lens including an array of concentrically arranged prisms, each prism having a total-reflection surface, a screen allowing image light to be incident on a back side thereof and to be viewable on a front side thereof by a viewer, a projection optical system for projecting the image light obliquely onto a surface of the screen, and at least one plane mirror disposed between the projection optical system and the screen, wherein an incident angle α of a ray incident on the screen from the projection optical system is between 60 degrees and 85 degrees inclusive, and wherein an angle γ made by a normal to a surface of a mirror nearest to the screen among the at least one plane mirror and a normal to the surface of the screen satisfies the following condition:

(45+(a minimum value of the angle α)/2) degrees≦γ≦(45+(a maximum value of the angle α)/2) degrees.

The above and further objects, features and advantages of the present invention will become apparent to those skilled in the art upon reading of the following detailed description of preferred embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a sectional view taken along a plane containing a central ray "a" and perpendicular to a screen. FIG. 1B is a sectional view of a part of the screen. FIG. 1C is an enlarged sectional view of a Fresnel plate of the screen.

DETAILED DESCRIPTION OF THE PREFERRED EMBODIMENTS

Preferred embodiments of the invention will be described in detail below with reference to the drawings.

First Embodiment

A projection-type display apparatus 1 according to a first embodiment of the invention is described with reference to FIGS. 1A, 1B and 1C through FIG. 10.

Figure 2:
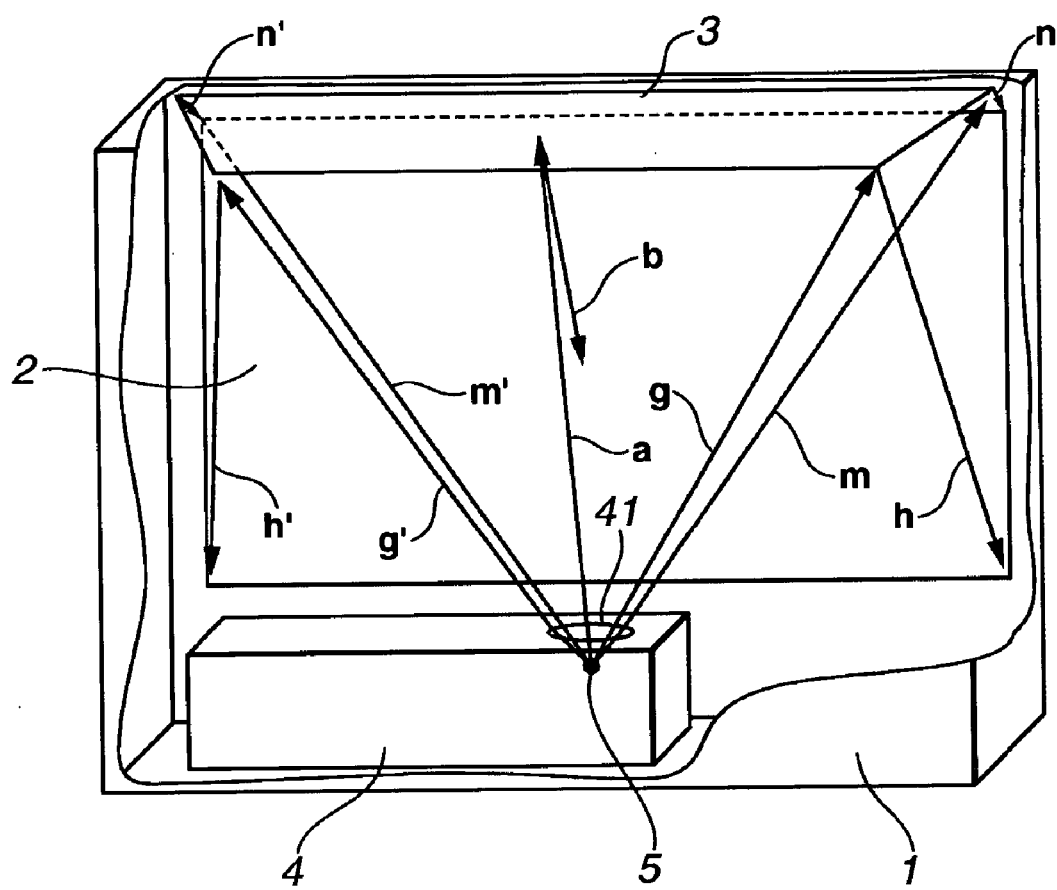
FIG. 2 is a perspective view, partially broken away, illustrating the projection-type display apparatus according to the first embodiment of the invention.

FIG. 2 is a schematic perspective view of the projection-type display apparatus 1 with an exterior portion thereof partially removed to illustrate interior portions thereof. A projection unit 4 is disposed in the lower part of the projection-type display apparatus 1. The projection unit 4 projects image light upward through a projection optical system 41. An upper mirror 3 bends an optical path of the image light downward. Then, the image light is incident on a transmission-type screen 2. (Herein, the term "screen" means a member including a glass plate, an optical element having the diffusion function, such as a lenticular plate, a Fresnel plate, etc.) A central ray "a", which is a ray corresponding to the center of an image plane, is projected from a pupil 5 of the projection optical system 41. The central ray "a" impinges on and reflects from the central portion of the upper mirror 3 and becomes a ray "b". The ray "b" is incident on the center of the screen 2. Likewise, rays "m", "m'", "g" and "g'", which are rays corresponding to the four corners of the image plane, respectively, are projected from the pupil 5. The rays "m", "m'", "g" and "g'" impinge on and reflect from the four corner portions of the upper mirror 3 and become rays "n", "n'", "h" and "h'", respectively. The rays "n", "n'", "h" and "h'" are incident on the four corners of the screen 2, respectively.

Figure 1A:
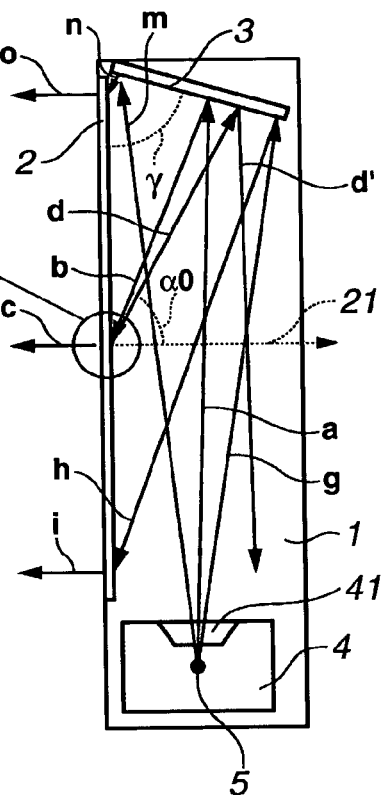
FIGS. 1A, 1B and 1C are diagrams showing the construction of a projection-type display apparatus according to a first embodiment of the invention. In particular.
Figure 1B:
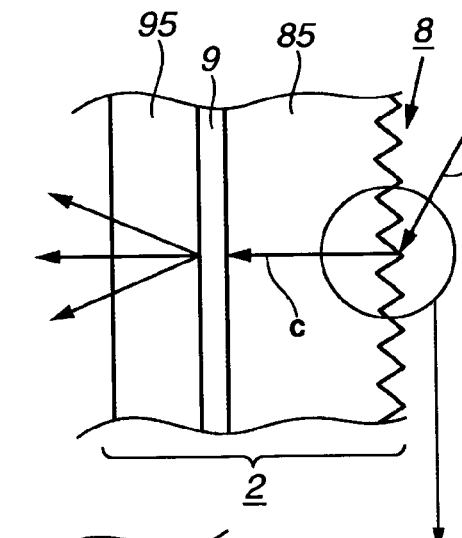
Figure 1C:
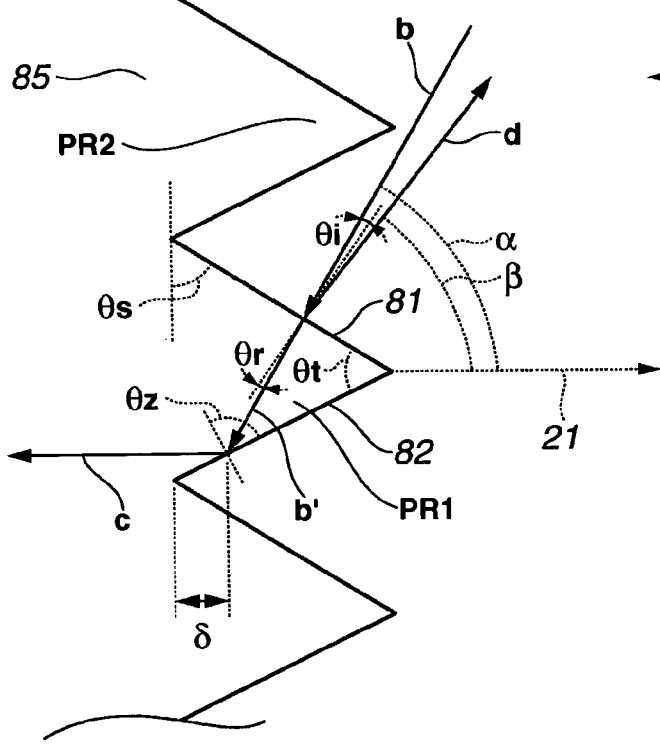

FIG. 1A is a sectional view of the projection-type display apparatus 1 taken along a plane containing the central ray "a" and perpendicular to the screen 2. FIG. 1B is a sectional view of a part of the screen 2. FIG. 1C is an enlarged sectional view of a Fresnel plate 85 of the screen 2. As mentioned above, the central ray "a" reflects from the upper mirror 3 and becomes a ray "b". (Herein, the upper mirror 3 is an optical element on which a light flux leading to the screen 2 is incident immediately before the screen 2.) The ray "b" is incident on the center of the screen 2 at an incident angle α0. On the light entrance side of the screen 2, a prism array 8 (which may be a single prism) is provided. The ray "b" is incident on and passes through an entrance surface 81 of a prism PR1 of the prism array 8 and becomes a ray "b'". The ray "b'" reflects from a total-reflection surface 82 of the prism PR1 and becomes a ray "c". The ray "c" exits in a direction approximately perpendicular to the screen 2. Likewise, by the action of the prism array 8 provided on the surface of the screen 2, the rays "m" and "g", which are rays corresponding to the four corners of an image plane (in FIG. 1A, the rays "m'" and "g'" overlapping the rays "m" and "g"), become rays "o" and "i", respectively, perpendicular to the screen 2. Then, the rays "o" and "i" exit from the screen 2. The details of the action of the prism array 8 are described later. Referring to FIG. 1B, the screen 2 includes a Fresnel plate 85 having the prism array 8, a lenticular plate 9 having the diffusion function, and a glass plate 95 provided for maintaining flatness of the whole screen 2 and for protection from damage. (A surface on the viewer side of the glass plate 95 corresponds to the surface of the screen 2 which is referred to later. The surface of the screen 2 is not limited to a plane surface of a glass plate having plane surface on both sides, such as the glass plate 95. For example, the surface of the screen 2 may be a plane surface of an optical member, which has the plane surface on one side and a non-plane surface on the other side, more specifically, the plane surface on the viewer side and a prism-shaped surface or lenticular-shaped surface on the opposite side, i.e., on the side of the projection unit 4.) By the action of the lenticular plate 9, rays emerging from the screen 2, including the rays "c", "o" and "i", are diffused rightward and leftward as well as upward and downward. Accordingly, a viewer can view a bright video image even from an oblique direction.

Figure 3:
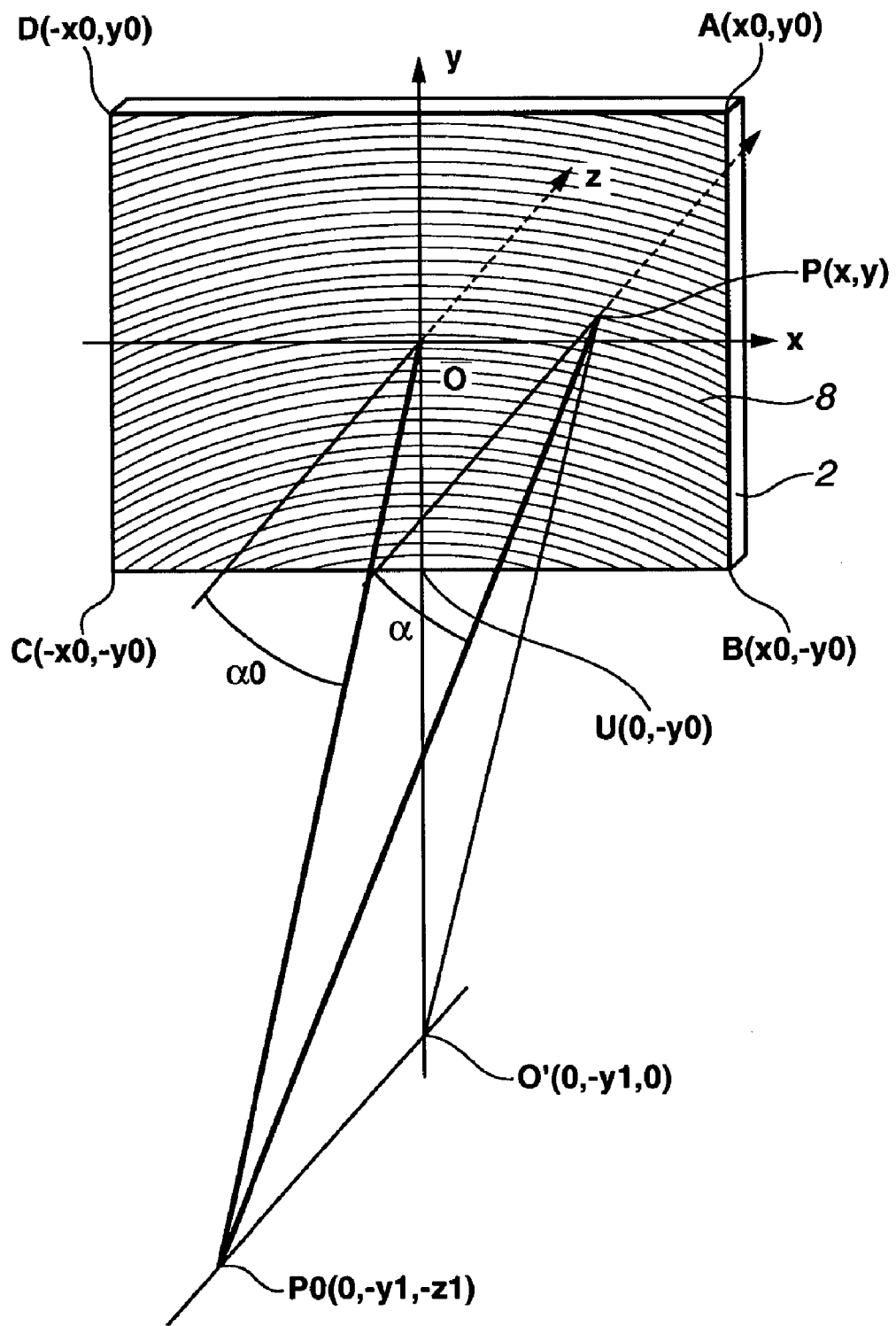
FIG. 3 is a cubic diagram illustrating the location of an optical system in the projection-type display apparatus according to the first embodiment of the invention.

The projection optical system 41 according to the first embodiment of the invention differs from an ordinary optical system in which a central portion thereof centered at an optical axis is used. In other words, the center of the screen 2 is disposed in a position in the direction considerably inclining from the optical axis of the projection optical system 41. The positional relationship between the projection optical system 41 and the screen 2 is described in detail with reference to FIG. 3, which is a cubic diagram. In the illustration of FIG. 3, the upper mirror 3 is omitted for clarity and, therefore, an image plane on the screen 2 is turned upside down with respect to that shown in FIG. 1A and FIG. 2.

Referring to FIG. 3, an x-y-z coordinate system is formed by coordinate axes with the center of the screen 2 set as the origin O. The size of an effective portion of the screen 2 is assumed to be "2x0" in the horizontal direction and "2y0" in the vertical direction. The center P0 of the pupil 5 of the projection optical system 41 is located in a position deviating by "−y1" in the y-axis direction. An incident angle α on an arbitrary point P on the image plane can be found from a tangential angle based on a distance from a point O' to the point P and a distance z1. Accordingly, on the circumference of a circle centered at the point O', the incident angle α is constant. Thus, if prisms having the same sectional shape in the radial direction are arranged concentrically, the incident angle α and the prism shape can be correlated with each other. If the prism shape is defined depending on the value of the incident angle α, the directions of exiting rays can be uniformed into the z-axis direction throughout the entire range of the image plane.

Here, specific numerical values employed, by way of example, in the first embodiment of the invention are shown. In terms of the size of the screen 2, the diagonal length is 60 inches and the aspect ratio is 16:9, i.e., 2x0=1328 mm and 2y0=747 mm. In terms of the point P0, y1=1110 mm and z1 =340 mm. Accordingly, the incident angle α0 on the center O of the image plane is 72.97°. A minimum incident angle is obtained at the position of the middle point U of the bottom side of the image plane and is 65.22°. A maximum incident angle is obtained at the positions of the right and left corners A and D of the top side of the image plane and is 78.19°. Thus, the distances y1 and z1 are defined in such a way as to satisfy the requirements of the first embodiment of the invention that the minimum incident angle is equal to or greater than 60 degrees (preferably, 65 degrees) and the maximum incident angle is equal to or less than 85 degrees (preferably, 80 degrees). The reason for setting the former limit (lower limit) is to maximize the performance of a total-reflection prism and is described later in detail. The reason for setting the latter limit (upper limit) is as follows. As is apparent from that a tangent value rapidly increases with an angle of 80 degrees or thereabout, even a slight error in projection direction of a projected ray causes a very large positional deviation. Therefore, the accuracy for positioning between the projection unit 4 and the screen 2 is required to be very high. Also, for the same reason, the various aberrations of the projection optical system 41 have a very large influence on an image on the screen 2.

It should be noted that the above-mentioned numerical values of incident angles are values of representative rays passing through the center of the pupil 5 of the projection optical system 41. Since the pupil 5 has a finite magnitude in practice, a light flux passing through the pupil 5 has a very slight amount of angular dispersion and concentrates on a single point on the surface of the screen 2. Therefore, it is necessary to take such an amount of angular dispersion into consideration depending on usable characteristics.

As is understandable from the numerical values of incident angles, the projection optical system 41 in the first embodiment of the invention is an oblique-projection optical system for projecting rays onto the surface of a screen which is considerably inclined relative to a central ray serving as a reference axis. Such an oblique-projection optical system may be configured in various fashions and may be composed of only lenses, of only mirrors, or of a combination of a lens or lenses and a mirror or mirrors. In addition, the projection optical system 41 may project, onto the surface of the screen 2, light from a liquid crystal display panel (of the reflection type or transmission type) or from an image display element such as a DMD (digital micromirror device), or may scan and project light from a light source such as an LED (light emitting element) Further, another conventional projection optical system may be used as the projection optical system 41. Herein, light from the image display element or light from the light source such as an LED is referred to as "image light".

As described above, the upper mirror 3 for bending an optical path of light, which is incident on the screen 2 at a large incident angle, contributes to the realization of a very thin display apparatus. The upper mirror 3, which is a plane mirror in the first embodiment of the invention, may be made to have a weak curvature having a focal length about fifty times the focal length of the entire projection optical system 41. Referring again to FIGS. 1A, 1B and 1C, in the first embodiment of the invention, an angle γ made by the upper mirror 3 and the surface of the screen 2 is 82°. (Herein, the surface of the screen 2 means a surface of the glass plate 95 in the shape of a parallel plain plate, or a surface equivalent thereto. The angle γ is an angle made by the normal to the surface of the upper mirror 3 approximately at the center of the upper mirror 3 and the normal to the surface of the screen 2. In cases where the upper mirror 3 has a weak curvature, "the normal to the surface of the upper mirror 3 approximately at the center of the upper mirror 3 " means the normal to the surface of the upper mirror 3 at a point where a ray passing through the center of the pupil 5 of the projection optical system 41 and leading to the center of the image projected on the screen 2 is reflected from the upper mirror 3.) Thus, the angle γ made by the upper mirror 3 and the surface of the screen 2 is within the range defined according to the invention, i.e., being equal to or greater than (45+(a minimum value of the angle α)/2)=77.61 degrees and equal to or less than (45+(a maximum value of the angle α)/2)=84.095 degrees. The former limit is a condition for making the ray "m" shown in FIG. 1A away from the screen 2. The latter limit is a condition for preventing the ray "g" from running off the rear edge of the upper mirror 3 rearward. Here, in cases where the minimum value of the angle α is equal to or greater than 60 degrees (preferably, 65 degrees) and the maximum value of the angle α is equal to or less than 85 degrees (preferably, 80 degrees), the angle γ made by the upper mirror 3 and the surface of the screen 2 is equal to or greater than 75 degrees (preferably, 77.5 degrees) and equal to or less than 87.5 degrees (preferably, 85 degrees).

The upper mirror 3 is disposed close to the upper side of the screen 2, so that the distance between the rear end of the upper mirror 3 and the surface of the screen 2 is about half the distance z1, i.e., 180 mm. Accordingly, the depth of the entirety of the display apparatus 1 can be set to 200 mm or thereabout even with the thickness of an exterior casing plate thereof taken into consideration. Thus, the display apparatus 1 can be made very thin as compared with a conventional apparatus having a depth of 450 mm or more. As for the height of the display apparatus 1, since rays are folded by the upper mirror 3, the length of the ray "a" (an optical path length of a ray traveling from the center of the pupil 5 of the projection optical system 41 to about the center of the surface of the upper mirror 3) is about 800 mm (i.e., 1.05 or more times and 1.2 or less times the height of the screen 2). Accordingly, the overall height of the display apparatus 1 can be set to 900 mm or thereabout, which is only slightly larger than (i.e., 1.05 or more times and 1.3 or less times, preferably 1.1 or more times and 1.25 or less times) the height 2y0=747 mm of the screen 2, even with the height of the projection unit 4 and the thickness of the exterior casing plate taken into consideration. Thus, a very small-sized projection-type display apparatus can be realized.

The action of a total-reflection prism with the range of incident angles set as mentioned above is described next with reference to FIG. 1C, which is an enlarged view of a part of FIG. 1B. FIG. 1C is a sectional view of the Fresnel plate 85 taken along a plane containing the normal to the surface of the screen 2 and the vertical direction thereof. The screen 2 includes, on the surface thereof, the Fresnel plate 85 (the prism array 8) in addition to the lenticular plate 9 and the glass plate 95. The cross-section of the Fresnel plate 85 is of such a shape that a plurality of triangles (triangle like figures) are coupled. Let an angle which the entrance surface

81 of the Fresnel plate 85 (the prism PR1) makes with the surface of the screen 2 be $\theta s$, the apex angle of the prism PR1 be $\theta t$, and an incident angle of the ray "b" on the surface of the screen 2 be $\alpha$. (The entrance surface 81 is a surface facing the upper mirror 3, which is an optical element on which a light flux leading to the screen 2 is incident immediately before the screen 2.) Then, an incident angle $\theta i$ of the ray "b" on the entrance surface 81 is determined by Equation (1):

$$\theta i = \alpha - \theta s \quad (1)$$

An exit angle $\theta r$ of a ray "b'" emerging from the entrance surface 81 after being refracted is also determined by Equation (2):

$$\sin(\theta r) = \sin(\theta i)/n \quad (2)$$

where n is a refractive index of the prism PR1.

Accordingly, an incident angle $\theta z$ of the ray "b'" on the total-reflection surface 82 is determined by Equation (3):

$$\theta z = \theta t - \theta r \quad (3)$$

The measure of the apex angle $\theta t$ need be selected such that the incident angle $\theta z$ becomes equal to or greater than the critical angle (42.16° when n=1.49). A condition for the direction of the exiting ray "c" as totally reflected being perpendicular to the surface of the screen 2 is determined by Equation (4):

$$\theta z = 180° - \theta t - \theta s \quad (4)$$

If Equation (4) is modified by using Equations (1), (2) and (3), the following Equation (5) can be obtained:

$$\tan(\theta s) = (\sin(\alpha) + n \sin(2\theta t))/(\cos(\alpha) - n \cos(2\theta t)) \quad (5)$$

Thus, if an acrylic resin (n=1.49) is used as the material of the prism array 8, in the case of $\theta t=58°$ and $\alpha=72.97°$, $\theta s=67.60°$ and $\theta z=54.40°$ result.

The above equations are applicable in any arbitrary position on the image plane. As for the minimum value and the maximum value of the angle $\alpha$, the angles $\theta s$ and $\theta z$ can also be calculated with n=1.49 and $\theta=58°$ predefined. When $\alpha min=65.22°$, $\theta s=64.49°$ and $\theta z=57.51°$ result. When $\alpha max=78.19°$, $\theta s=69.69°$ and $\theta z=52.31°$ result.

Accordingly, forming concentric prisms into the prism array 8 while gradually varying the angle $\theta s$ from 64.49° to 69.69° to obtain the particular values of the angle $\theta s$ determined by Equation (5) according to the variation of $\alpha=65.22°$ to 78.19° with the angle $\theta t$ kept constant makes it possible that the directions of exiting rays from the screen 2 are made perpendicular to the surface of the screen 2 throughout the entire range of the image plane.

Moreover, a total-reflection condition is also satisfied as follows. As for the total-reflection condition, it is necessary to take into consideration the above-mentioned angular dispersion caused by the magnitude of the pupil 5 and the diffusion of the ray "b'" caused by surface roughness of the entrance surface 81. In the first embodiment of the invention, the magnitude of the pupil 5 is 28 mm in diameter. The position for a minimum projection distance where the angular dispersion becomes largest is the middle point U of the bottom side of the image plane, and the minimum projection distance is about 811 mm. Accordingly, the angular dispersion is about 1° on one side. An angle of diffusion caused by surface roughness of the entrance surface 81 was found from experiment to be about 4°. With these values taken into consideration, a minimum value of the incident angle $\theta z$ results in about 47.3°, which is a value sufficiently larger than the critical angle of 42.16°.

Thus, the direction of an exiting ray from the screen 2 is changed by total internal reflection into a direction perpendicular to the surface of the screen 2 throughout the entire range of the image plane. Accordingly, loss in quantity of light can be made minimum and uniform throughout the entire range of the image plane, so that an even-brightness image can be high-efficiently obtained on the screen 2.

Figure 4:
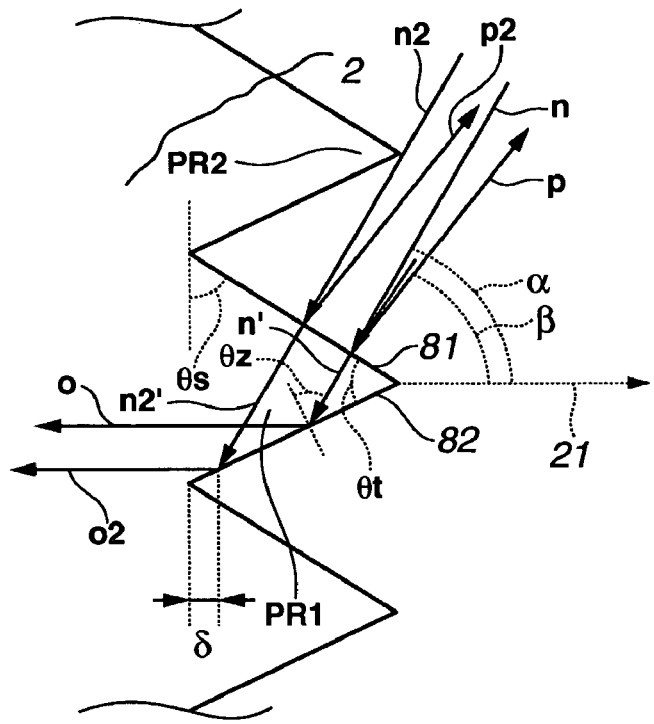
FIG. 4 is an enlarged sectional view of a prism portion in the first embodiment of the invention.
Figure 5:
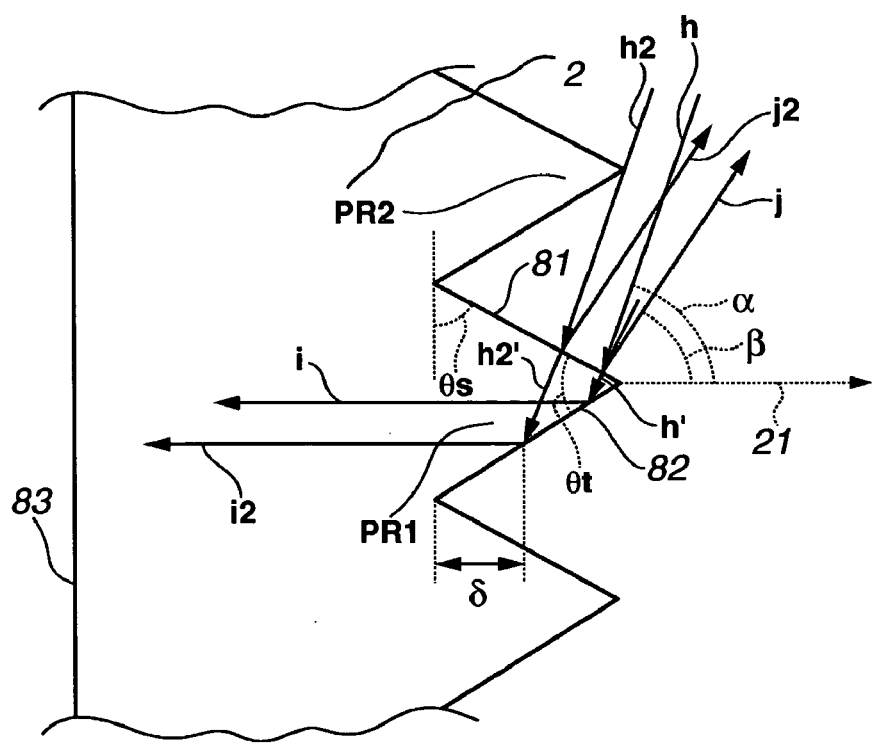
FIG. 5 is an enlarged sectional view of the prism portion in the first embodiment of the invention.

All rays are made to impinge on a total-reflection surface as described below. FIGS. 4 and 5 are enlarged views of a prism portion of the screen 2 with rays having a minimum value and a maximum value of the incident angle $\alpha$, respectively. When the incident angle $\alpha$ is relatively large as shown in FIG. 5, total reflection surely occurs. On the other hand, when the incident angle $\alpha$ is relatively small as shown in FIG. 4, a ray "n2" passing near the apex of the adjoining prism PR2 impinges on and reflects from a portion of the total-reflection surface 82 near the tooth bottom. Should the height $\delta$ from the ideal end of the tooth bottom of the prism portion to such a reflection position becomes a negative value, a corresponding incident ray would advance straight without impinging on the total-reflection surface 82. Moreover, the end of the tooth bottom of the prism portion is required to have finite roundness from the viewpoint of production difficulty. Therefore, the height $\delta$ is required to be sufficiently large so as to ensure that all incident rays are incident on the total-reflection surface 82 in spite of the roundness of the end of the tooth bottom. Furthermore, the size of each prism is required to be sufficiently smaller than the size of one pixel of a displayed image. This is because vertical inversion of rays owing to total internal reflection causes the arrangement order of pixels to be vertically inverted at every pitch of prisms if the pitch is larger than one pixel. If the pitch of prisms is nearly equal to the size of one pixel, a beat occurring between two spatial frequencies of the prism pitch and the pixel pitch results in moiré. Therefore, the prism pitch is desirable to be equal to or less than half the size of one pixel, i.e., considerably small. Accordingly, in view of the size of each prism, the influence of the roundness of the end of the tooth bottom is not negligible. Furthermore, as is the case with the above-described total-reflection condition, it is necessary to take into consideration the angular dispersion (about 1°) caused by the magnitude of the pupil 5 and the diffusion (about 4°) of the ray "b'" caused by surface roughness of the entrance surface 81.

Exemplary numerical values in the first embodiment of the invention are as follows. The number of pixels of a displayed image is 1920 in the horizontal direction and 1080 in the vertical direction. The size of one pixel is about 0.7 mm. The pitch of prisms of the Fresnel plate 85 is thus set to 0.2 mm. Accordingly, the values of the height $\delta$ corresponding to the incident angles $\alpha min$, $\alpha 0$ and $\alpha max$ are about 0.04, 0.09 and 0.12 mm, respectively. In other words, the roundness of the end of the tooth bottom can be set to a value equal to or less than 0.02 mm, which is a value sufficiently available for production.

The measure of the height $\delta$ decreases as the incident angle $\alpha$ decreases or as the apex angle $\theta t$ is increased. For example, for ease of explanation, if $\alpha=60°$ and $\theta t=60°$, $\theta s=60°$ results. In other words, the prism becomes a regular triangle, so that $\delta=0$ results. Therefore, in order to sufficiently secure the height $\delta$, the apex angle $\theta t$ has to be made considerably smaller than 60° in the case of $\alpha=60°$. However, if the apex angle $\theta t$ is made smaller, another problem arises as described later. Therefore, in practice, it is necessary to set the minimum value of the incident angle $\alpha$ to 60° or more, preferably 65° or more.

As described above, according to the first embodiment of the invention, total internal reflection of all rays can be realized by defining the minimum value of the incident angle α and limiting the upper limit of the apex angle θt based on the minimum value of the incident angle α. By this arrangement, flare or loss in quantity of light, which is caused by rays passing through the screen 2 without being totally reflected by total-reflection surfaces, can be prevented.

In the meantime, at the entrance surface 81 of the prism PR1, a reflected ray "d" occurs in addition to the transmitted ray "b'". The quantity of light of the reflected ray "d" is about 4% in reflectance in the case of the prism PR1 having a refractive index of 1.49. If the reflected ray "d" eventually returns to the screen 2, it can be viewed as a conspicuous ghost image. In consideration of a condition for preventing such a ghost image, the lower limit of the apex angle θt is set.

Figure 6:
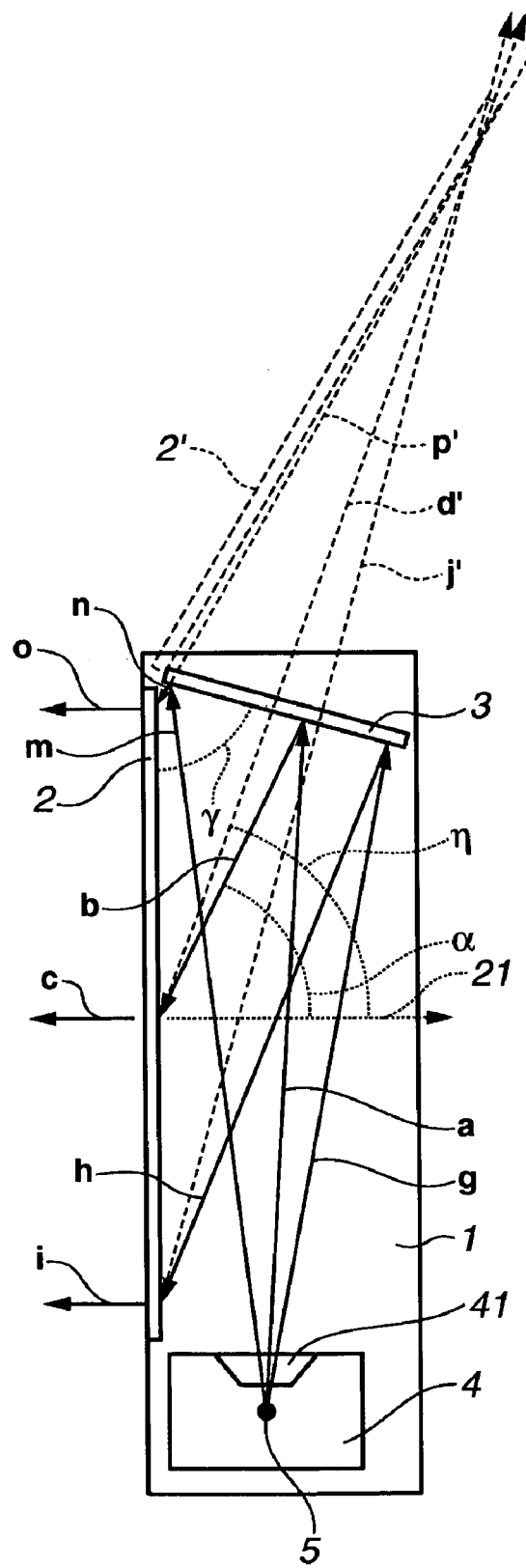
FIG. 6 is a sectional side view of the projection-type display apparatus according to the first embodiment of the invention.

FIG. 6 is a sectional view for explaining the setting of the lower limit of the apex angle θt. In FIG. 6, parts corresponding to those shown in FIG. 1A are denoted by the same reference characters. Reference character 2' denotes a virtual image of the screen 2 reflected in the upper mirror 3. Arrow "d'" represents the direction in which a reflected ray of the incident ray "b" from the screen 2 is incident on the upper end of the virtual image 2' of the screen 2. If the real reflected ray "d" shown in FIG. 1A is made to advance in a direction nearer to the right than the arrow "d'" in FIG. 6, i.e., in a direction away from the screen 2, it is impossible that the reflected ray "d" returns to the screen 2. In other words, the apex angle θt of the prism PR1 is set to such a value as to prevent a ray reflecting from the entrance surface 81 of the prism PR1 and then reflecting from the upper mirror 3 (a mirror nearest to the screen 2 on an optical path of image light) from falling again on the screen 2. As a matter of course, this condition has to be satisfied likewise at all points on the surface of the screen 2. In other words, it is necessary that an angle β made by the reflected ray "d" and the normal 21 to the surface of the screen 2 (see FIG. 1C) is smaller than an angle η at which a reflected ray of the incident ray "b" from the screen 2 is incident on the upper end of the virtual image 2' of the screen 2.

The angle β is expressed as Equation (6) using the above Equation (1):

$$\beta = \alpha - 2 \times \theta i = 2 \times \theta s - \alpha \quad (6)$$

Accordingly, it is understood that, in order to satisfy the above condition for the angle β, it is necessary to make the angle θs smaller. The Equation (5) as mentioned previously implies that, when the apex angle θt is 60° or thereabout, if the apex angle θt is made larger, the angle θs becomes smaller. Therefore, in order to make the angle β of the reflected ray "d" smaller, the apex angle θt has to be made larger. This is the reason for setting the lower limit of the apex angle θt.

As for the angle β of the reflected ray "d", it is also necessary to take into consideration the angular dispersion (equal to or greater than 0.1° and equal to or less than 2°; more preferably equal to or greater than 0.5° and equal to or less than 1.5° about 1° in the first embodiment) caused by the magnitude of the pupil 5 and the diffusion (equal to or greater than 2° and equal to or less than 7°; more preferably equal to or greater than 2.5° and equal to or less than 5°; about 4° in the first embodiment) of the ray "d" caused by surface roughness of the entrance surface 81. Thus, the reflection angle β of a representative ray passing through the pupil 5 is required to have a margin of about 5° or more with respect to the angle η.

Ray tracing in the case of the first embodiment reveals that, with respect to the incident angles αmin, α0 and αmax on the screen 2, the angle β is 63.76°, 62.23° and 61.19°, respectively, and the angle η is 74.4°, 79.4° and 82.7°, respectively. Thus, the respective margins of the angle β with respect to the angle η are 10.64°, 17.17° and 21.51°, which are sufficiently large values.

In this example, the apex angle θt is set to 58°. In such a case, the above-mentioned margins result. From this point of view, it is desirable that the apex angle θt is set to a value equal to or greater than 50° and equal to or less than 65°, more preferably, to a value equal to or greater than 55° and equal to or less than 61°. As described above, if the angle β is sufficiently smaller than the angle η, the reflected ray "d", even after being reflected by the upper mirror 3, advances as the ray "d'" shown in FIG. 1A in a direction away from the screen 2 inside the projection-type display apparatus 1. Accordingly, if antireflection treatment is applied to interior surfaces of the casing of the projection-type display apparatus 1, the influence of the reflected ray "d" on the image plane can be perfectly eliminated with ease, and a clear video image can be displayed without any ghost image.

Making the apex angle θt constant throughout the entire surface of the screen 2 in the first embodiment provides advantages as described below. In manufacturing a prism array, a method of hot-pressing a substrate material onto a mold and transferring the shape of the mold to the substrate material, a method of dripping an ultraviolet curing resin to a mold, forming a transparent substrate material appressed to the mold and curing the material with ultraviolet radiation, or the like, is generally employed. In either case, using a mold contributes to an improvement in mass productivity. The mold is produced by engraving with an expensive diamond cutting tool in order to achieve optically excellent prism surfaces. The apex angle of the diamond cutting tool is directly used to shape the apex angle θt of a prism. Therefore, if different apex angles θt are to be shaped, a number of types of diamond cutting tools corresponding to the respective apex angles θt are required. Furthermore, even if the required number of types of diamond cutting tools can be decreased to two or three, a joint may appear at a point where the diamond cutting tools are changed. In order to make such a joint inconspicuous, very high-precision positioning is required. On the other hand, if the apex angle θt is made constant throughout the entire image plane as in the first embodiment of the invention, only engraving the apex angle θt on the substrate material while changing the attitude of the diamond cutting tool to vary the angle θs is required without changing diamond cutting tools. Accordingly, only one diamond cutting tool is required, and no joints will appear. Thus, a uniform, high-quality and low-cost prism array can be realized.

Figure 7:
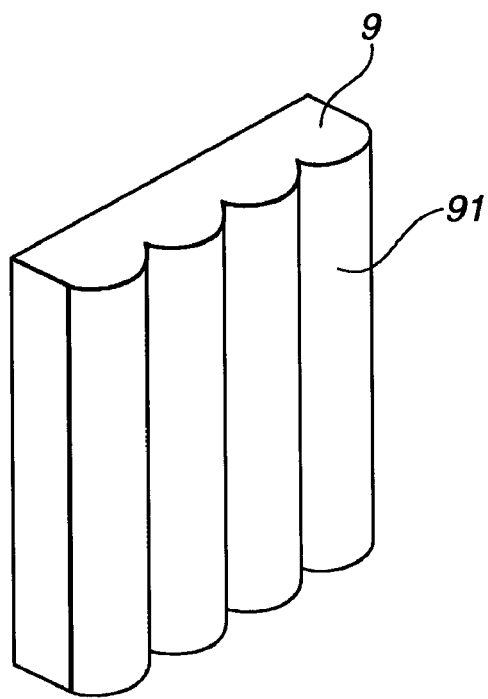
FIG. 7 is an enlarged perspective view of a lenticular plate in the first embodiment of the invention.
Figure 8:
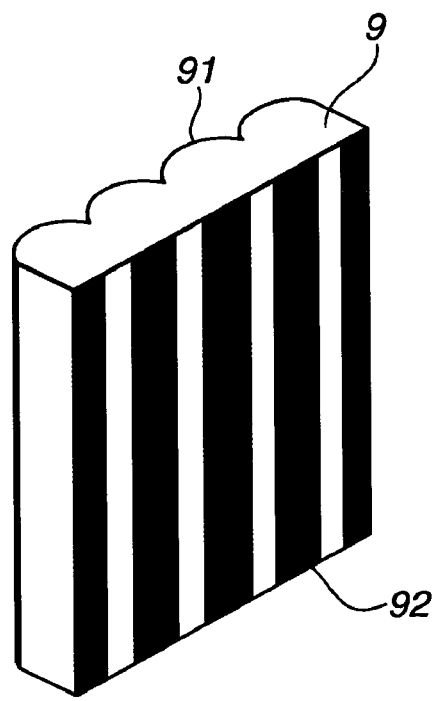
FIG. 8 is an enlarged perspective view of the lenticular plate in the first embodiment of the invention.
Figure 9:
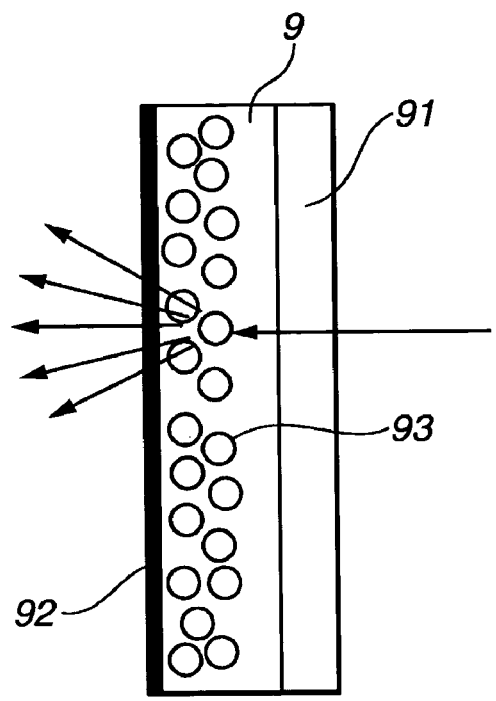
FIG. 9 is an enlarged sectional view of the lenticular plate in the first embodiment of the invention.
Figure 10:
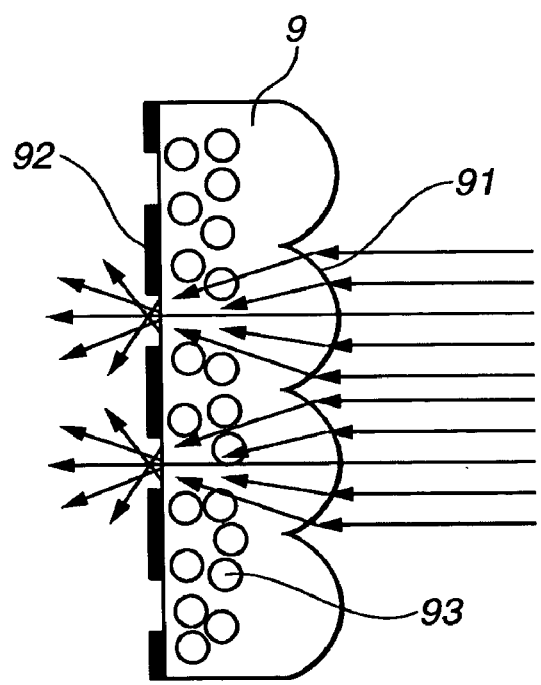
FIG. 10 is an enlarged sectional view of the lenticular plate in the first embodiment of the invention.
Figure 11:
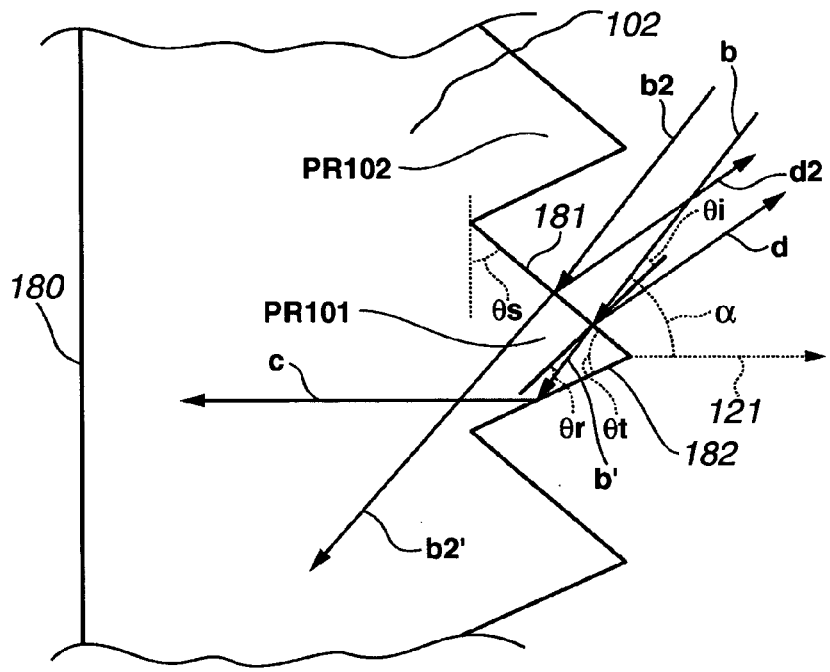
FIG. 11 is an enlarged sectional view of a conventional prism portion.
Figure 12:
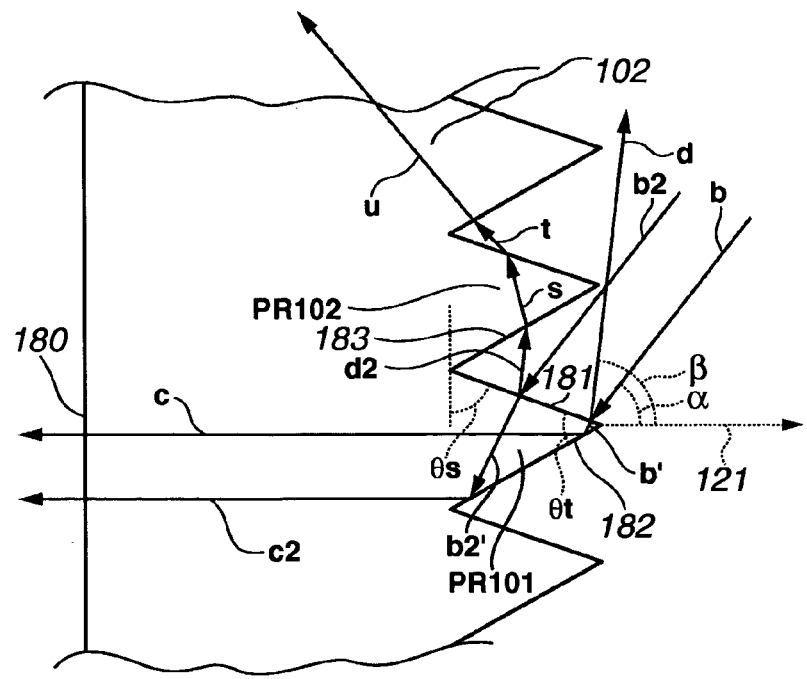
FIG. 12 is an enlarged sectional view of a conventional prism portion.
Figure 13:
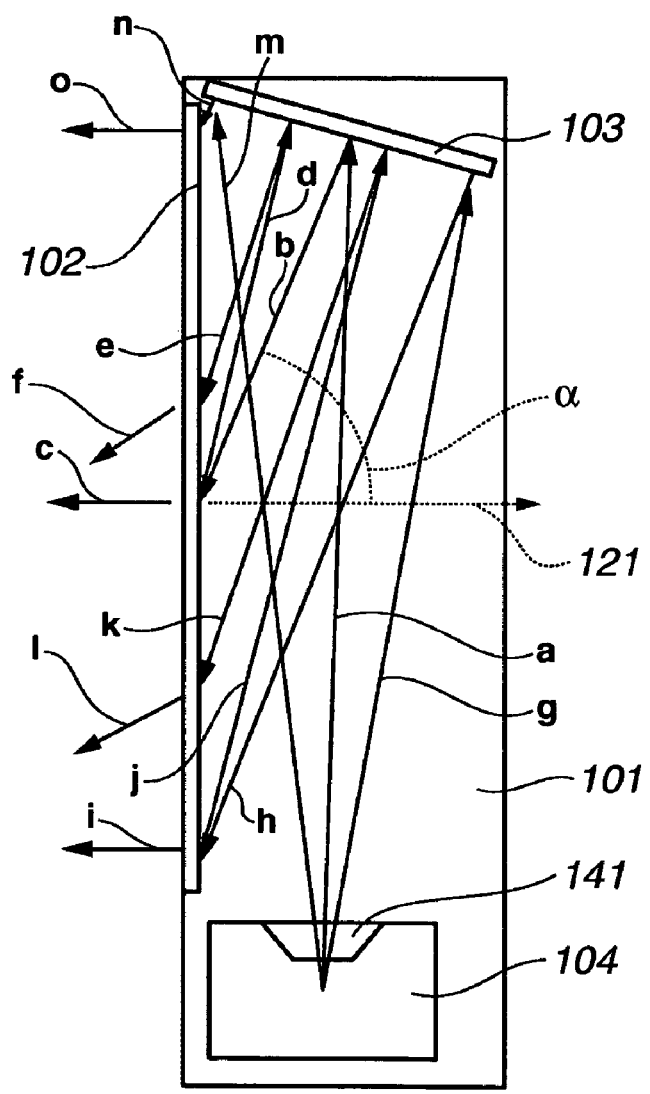
FIG. 13 is a sectional side view of a conventional projection-type display apparatus.

The lenticular plate 9 is described next with reference to FIGS. 1A, 1B and 1c and FIGS. 7 to 10. The ray "c", which is bent by the prism array 8 in a direction perpendicular to the surface of the screen 2, is a diffused ray subjected to angular dispersion (about 1°) by the magnitude of the pupil 5, diffusion (about 4°) by surface roughness of the entrance surface 81 and diffusion (similarly, about 4°) by the total-reflection surface 82. The diffusion angle of the diffused ray "c" amounts to about 9°. In this condition, when viewed straight from the front, an image displayed on the screen 2 is very bright. However, when viewed even slightly obliquely from above or below or from the right or left, an image displayed on the screen 2 becomes very dark. In practice, it is desirable that the screen 2 should have an angle of view of 60° or more on one side in the horizontal direction and an angle of view of 30° or more on one side in the vertical direction. For that purpose, the lenticular plate 9 having a diffusing function is provided in the screen 2. FIGS. 7 to 10 are diagrams illustrating the lenticular plate 9 for use in the first embodiment of the invention. In particular, FIGS. 7 and 8 are enlarged views of a part of the lenticular plate 9 as seen from the light entrance side and from the viewer side, respectively. FIGS. 9 and 10 are vertical and horizontal sectional views of the lenticular plate 9, respectively. On the light entrance side of the lenticular plate 9, a lenticular lens 91 composed of a large number of semicylinders extending in the vertical direction is provided. On the viewer side of the lenticular plate 9, a striped film 92 made from a light absorbing material and having aperture portions placed opposite to the respective semicylinders is provided. Furthermore, in the material of the lenticular plate 9, a large number of beads 93 each made from a high-refractive-index material are mixed and unevenly distributed on the side nearer to the viewer side.

A ray made to advance in the direction perpendicular to the screen 2 by the Fresnel plate 85 having total-reflection prisms is diffused by the beads 93 with respect to the vertical direction, as indicated by arrows in FIG. 9. With respect to the horizontal direction, rays are collected by the lenticular lens 91 and are diffused at the aperture portions of the striped film 92 provided on the plate surface on the viewer side of the lenticular plate 9, as shown in FIG. 10. In this instance, the rays also undergo the action of the beads 93. Accordingly, the degree of diffusion with respect to the horizontal direction is larger than with respect to the vertical direction. Thus, the diffusion angles in the vertical direction and the horizontal direction result in about 30° and about 60°, respectively. Since the beads 93 are unevenly distributed on the viewer side in such a way as not to impair the light collecting action of the lenticular lens 91, the aperture portions of the striped film 92 can be made considerably narrow. The striped film 92 has the function of absorbing external light coming from the viewer side and contributes to keeping image contrast high under bright environment. Since the aperture portions of the striped film 92 are narrowed as mentioned above, very high contrast can be obtained.

As described above, in the lenticular plate 9, since different angles of view are set with respect to the vertical direction and the horizontal direction, brightness is compatible with a wide angle of view in the horizontal direction, and high contrast can be obtained. However, it should be noted that the lenticular plate 9 is not limited to the above-described structure. For example, instead of mixing the beads 93 in the lenticular plate 9, the surface of the aperture portions of the striped film 92 may be roughened for diffusing rays, a light diffusing sheet may be bonded to the lenticular plate 9 or the Fresnel plate 85, or a simple light diffusing plate may be used in place of the lenticular plate 9.

It should be noted that the above-described specific numerical values in the first embodiment of the invention are not limitative, but may be changed without departing from the spirit and scope of the invention. For example, the screen size or the aspect ratio may be freely determined, and the distances z1 and y1 may be determined such that the incident angle α is within the range of 60° to 85° inclusive. Furthermore, the apex angle θt of each prism is not limited to 58°, but may be set to such a value less than 58° as to ensure that the reflected ray does not return to the screen 2.

Second Embodiment

A second embodiment of the invention is described next. In the case of the first embodiment, the apex angle θt is made constant throughout the entire range of the image plane such that a mold can be produced by using only a single diamond cutting tool. However, several cutting tools having different apex angles θt may be used to produce a mold. In this case, although it is difficult to perform cutting of the mold in such a way as to make a joint inconspicuous, the apex angle θt is made larger when the incident angle α is large, and the apex angle θt is made smaller when the incident angle α is small. By doing so, both the margin of the reflection angle β of a reflected ray from the entrance surface and the margin related to the roundness of the tooth top and tooth bottom of each prism can be made larger.

In the case of the first embodiment, the angle β of the reflected ray "d" from the entrance surface 81 of the prism PR1 is set to have a margin with respect to the angle η, including a diffusion angle caused by surface roughness of the entrance surface 81. However, if the diffusion angle is made sufficiently larger by intentionally roughening the entrance surface 81, it is not necessary to use the entire diffusion angle as a margin. In actuality, as long as there is such a margin that a fraction of energy of the reflected ray "d" which returns to the screen 2 is a few percentage or less, the reflected ray "d" becomes sufficiently small in brightness without being conspicuous as a ghost image. This means substantially implementing the gist of the invention.

Roughening the entrance surface 81 as described above can be very easily performed by roughening the surface of a mold by use of sandblast, chemical treatment or the like, and is effective as a means of supplementing a part of the function of the lenticular plate 9 for enlarging an angle of view. In addition, the total-reflection surface 82 or the viewer-side surface of the lenticular plate 85 can be roughened. If sufficient diffusion is obtained by such measures, it becomes unnecessary to mix the beads 93 in the lenticular plate 9, so that the screen 2 can be produced at low cost.

According to the above-described embodiments, a thin-shaped projection-type display apparatus which has a relatively-low overall height as compared with the height of a screen and which is capable of displaying a high-quality image without causing any ghost image can be realized. Furthermore, a projection-type display apparatus which is capable of high-efficiently obtaining uniform brightness throughout the entire range of the image plane and which is capable of displaying a clear and high-quality image without ghost or flare can be realized at low cost.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

What is claimed is:

1. A projection-type display apparatus, comprising:
   a projection optical system for guiding image light to the screen, the projection optical system including a plurality of optical elements;
   a screen having a plurality of arc-curved prisms;
   a cross sectional share of the plurality of prisms being triangle;

wherein an optical element disposed nearest to the screen on an optical path of the image light among the plurality of optical elements is a substantially flat mirror, wherein θt is between 50 degrees and 58 degrees when an apex angle of the triangle facing the flat mirror is θt, and wherein an angle by a surface of the substantially flat mirror and a surface of the screen is between 75 degrees and 87.5 degrees inclusive.

2. The projection-type display apparatus according to claim 1, wherein the mirror is a flat mirror, wherein a plane of the mirror is oriented more perpendicular than parallel to a plane of the screen.

3. A projection-type display apparatus according to claim 1, wherein the apex angle θt is constant with respect to all the prisms in the screen.

4. A projection-type display apparatus according to claim 1, wherein the plurality of prisms include a first prism disposed on the first arc and a second prism disposed on a second arc which is concentric with the first arc and different from the first arc, and wherein the cross sectional shape of the first prism is different from that of the second prism.

5. A projection-type display apparatus, comprising:
a screen having a plurality of arc-curved prisms;
a cross sectional share of the plurality of prisms being triangle;
a projection optical system for guiding image light to the screen, the projection optical system including a plurality of optical elements;
wherein an optical element disposed nearest to the screen on an optical path of the image light among the plurality of optical elements is the mirror,
wherein an apex angle θt is facing the mirror, wherein θt is between 50 degrees and 58 degrees,
wherein an angle α made by an optical path of the image light falling on the screen after passing through the center of a pupil of the projection optical system and a normal to a surface of the screen is between 60 degrees and 85 degrees inclusive, and
wherein an angle made by a normal to a surface of the mirror approximately at the center of the mirror and the normal to the surface of the screen is between (45+(a minimum value of the angle α)/2) degrees and (45+(a maximum value of the angle α)/2) degrees inclusive.

6. A projection-type display apparatus according to claim 5, wherein the angle α made by an optical path of the image light falling on the screen after passing through the center of a pupil of the projection optical system and a normal to a surface of the screen is 65 degrees or more.

7. A projection-type display apparatus according to claim 5, wherein the angle α made by an optical path of the image light falling on the screen after passing through the center of a pupil of the projection optical system and a normal to a surface of the screen is 80 degrees or less.

8. A projection-type display apparatus according to claim 5, wherein the apex angle θt is constant with respect to all the prisms in the screen.

9. A projection-type display apparatus according to claim 5, wherein the plurality of prisms include a first prism disposed on the first arc and a second prism disposed on a second arc which is concentric with the first arc and different from the first arc, and wherein the cross sectional shape of the first prism is different from that of the second prism.

* * * * *